Jan. 31, 1961 J. P. ECKERT, JR 2,970,293
BINARY COUNTER
Filed May 10, 1954 2 Sheets-Sheet 1
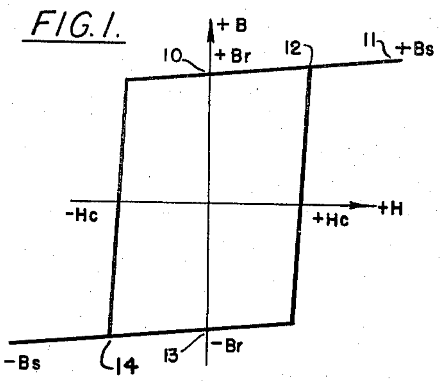
FIG. 1.
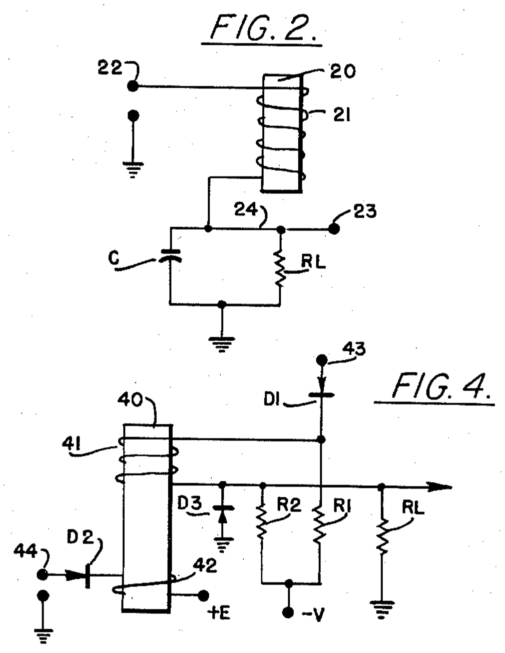
FIG. 2., FIG. 4.
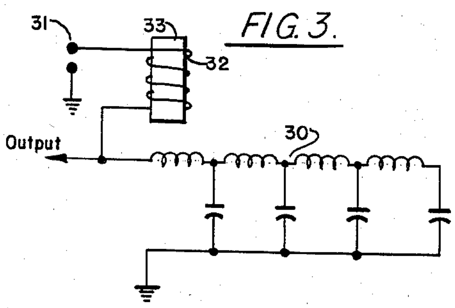
FIG. 3.
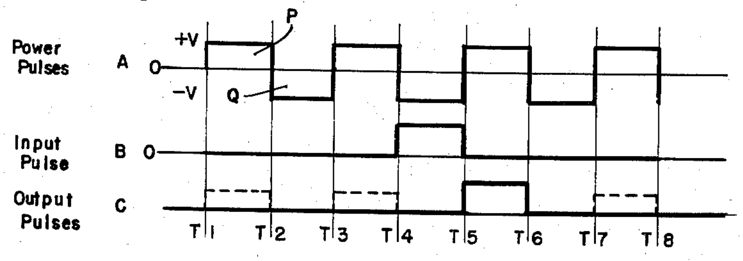
FIG. 5.
FIG. 6.
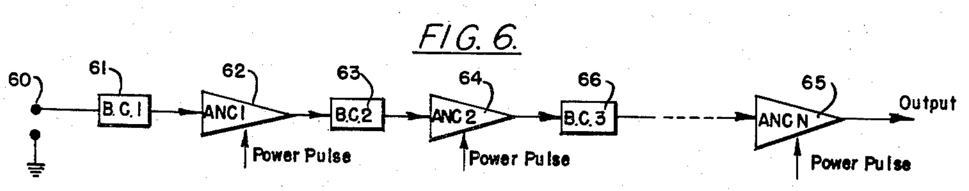
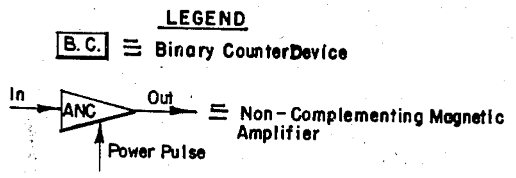
INVENTOR.
JOHN PRESPER ECKERT, JR.
[signature]
ATTORNEY INVENTOR.
JOHN PRESPER ECKERT, JR.
[signature]
ATTORNEY United States Patent Office 2,970,293
Patented Jan. 31, 1961

2,970,293

BINARY COUNTER

John Presper Eckert, Jr., Philadelphia, Pa., assignor, by mesne assignments, to Sperry Rand Corporation, a corporation of Delaware Filed May 10, 1954, Ser. No. 428,656
8 Claims. (Cl. 340—174)

The present invention relates to computing devices and is more particularly concerned with a novel construction of binary counters which can be utilized for counting large numbers.

As is well known in the computing arts, one of the basic components of computer devices is the so-called counter or "modulo 2 counter" device. These devices are characterized by the fact that they normally give but a single output for two successive inputs. In the past, such counter devices have been constructed in the form of vacuum tube circuitry; and while such circuitry has performed quite reliably and has been quite effective, such vacuum tube components were subject to the disadvantages, first, that they are of relatively large size, making packaging and other disposition of components difficult; second, that they are subject to breakage and as a result make for a relatively fragile counter; and third, that in the normal course of operation they are subject to operating failure, thus raising serious questions of maintenance and the cost attendant thereto.

It is accordingly a prime object of the present invention to provide a binary counter which is inexpensive to construct, very reliable in operation, and which is rugged in structure.

It is a further object of the present invention to provide a binary counter which utilizes magnetic devices to effect the counting operations.

Still a further object of the present invention resides in the provision of a binary counter device which utilizes alternate amplifier and counter stages, each of these stages being in the form of magnetic circuitry.

Still another object of the present invention resides in the provision of a counter which is highly reliable in operation and which can be made in relatively small sizes.

Another object of the present invention resides in the provision of magnetic counter circuits which can be readily utilized in known types of computing apparatuses.

In accordance with the foregoing objects, I provide a binary counter which, in its basic form, utilizes but a single core of magnetic material, preferably exhibiting a substantially rectangular hysteresis loop. This binary counter stage carries a coil thereon which is coupled to a storage network whereby input pulses initially caused an energy storage in the said network through the coil; the storage network later discharges at least partially through the coil, in a reverse direction, to "flip" the core thereby selectively changing the impedance characteristics thereof. As a result of this operation, the counter of the present invention effectively produces but a single output for two successive input pulses.

I further provide a counter chain for the counting of large numbers which utilizes the aforedescribed binary counters with magnetic amplifier stages interposed therebetween. In this respect, it should be noted that the following discussion is confined to interposed amplifier stages which are of the "non-complementing" series type, which terminology will become clear from the following discussion. However, magnetic amplifiers of the type used herein may be either of the "series" or "parallel" type and/or "complementing" or "non-complementing" in type. In addition, these series or parallel complementing or non-complementing amplifiers may take the form of one, two, or three winding amplifiers. Again while I will describe the basic binary counter circuit as one wherein the storage network (capaictor or pulse-forming line) is in series with the coil winding on the counter core, it is also apparent that the said storage network may be either in series with or in parallel with the said winding. Thus, a great number of variations of the circuit to be described are readily possible, and these variations are intended to fall within the scope of the present disclosure.

The foregoing objects, advantages and description of my invention will become more readily apparent from the following description and accompanying drawings, in which:

Figure 1 is an idealized hysteresis loop of a magnetic material which may be employed in the cores of my binary counter and magnetic amplifier circuits;

Figure 2 is a schematic of a single core binary counter employing a series capacitor coupled to the core winding;

Figure 3 is an improved form of binary counter of the type shown in Figure 2 utilizing a pulse-forming network of the Guillemin line type in place of the capacitor in Figure 2;

Figure 4 is a schematic representation of a single core, two winding, non-complementing, magnetic amplifier, which may be used in practicing one embodiment of the present invention;

Figures 5 (A, B, and C) are wave-form diagrams depicting the operation of the magnetic amplifier circuit of Figure 4;

Figure 6 is a logical diagram of a counter chain comprising alternate binary counters and magnetic amplifiers connected together for the counting of high numbers;

Figure 7:
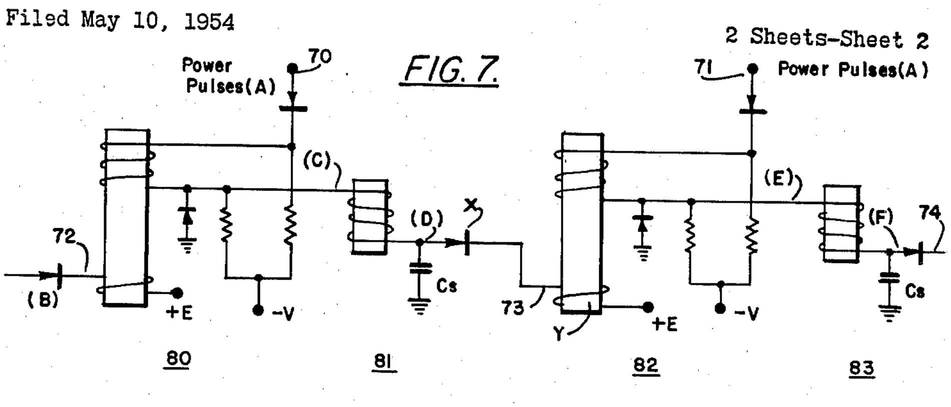
Figure 7 is a schematic diagram of two stages each of amplifier and binary counters, as shown in Figure 6.

Referring now to Figure 1, it will be seen that the magnetic cores utilized in the binary counter stages and in the magnetic amplifiers of my invention preferably exhibit a subtsantially rectangular hysteresis loop. It must be stressed that such a hysteresis loop characteristic is by no means mandatory in the selection of core materials to be utilized, but inasmuch as it has been found that such materials give very good results it is preferred that such materials be selected in the practice of the present invention. The curve exhibits several significant points of operation, namely, point 10 (plus $B_r$) which represents a point of plus remanence; the point 11 (plus $B_s$) which represents plus saturation; the point 12, which is a point representative of the beginning of the plus saturation region; the point 13 (minus $B_r$) which represents minus remanence; and the point 14 which is a point representative of the beginning of the minus saturation region.

Discussing for the moment the operation of a core which exhibits a hysteresis loop such as is shown in Figure 1, and assuming for the moment that the core is at operating point 10 (plus remanence), if a current should be passed through a coil mounted on the said core, in a direction tending to strengthen the flux output of the said core in the same direction (i.e. in a direction of +H) the core will tend to be driven from point 10 (plus $B_r$) to point 11 (plus $B_s$). During this state of operation, the said coil mounted on the core presents a relatively low impedance and energy fed to the said coil will pass readily therethrough. On the other hand, if the core is at point 13

(minus $B_r$) the application to the said coil of a pulse of the same polarity as was previously discussed (in the direction +H) will tend to drive the core from point 13 (minus $B_r$) through point plus $H_c$ (plus coercive force), to point 12 and thence to point 11. In the operation of the device the applied pulse is so limited that only point 12 is actually reached. During this state of operation, the coil presents a relatively high impedance and substantially all of the energy applied thereto is expended in flipping the core from point 13 to point 12, with practically none of this energy passing through the said coil to give a usable output. Thus, depending upon whether the core is at point 10 or at point 13, a pulse applied with a given polarity will be presented with either a high impedance or a low impedance. These considerations are of great value in the construction of a simple binary counter such as is shown in Figure 2. It should be noted that the precise counting device shown in Figure 2 has already been disclosed in the copending application of William F. Schmitt, Serial No. 434,465, now U.S. Patent No. 2,713,675, issued July 19, 1955, for "Single Core Binary Counter."

Typical wave form operating characteristics of the device of Figure 2 may be seen by referring to Figures 8C and 8D. Describing the functioning of the counter shown in Figure 2 now, and referring to Figures 8C and 8D, it will be seen that I provide a single core 20 of material preferably having a hysteresis loop substantially the same as that shown in Figure 1. This core may be made of a variety of materials, among which are various types of ferrites and various kinds of magnetic tapes, including Orthonik and 4–79 Moly-Permalloy. These materials, further, may have different heat treatments to give them different desired properties. In addition to the wide variety of materials applicable, the core of the signal translating devices may be constructed in a number of different geometries, including both closed and open paths. For example cup-shaped cores, strips of materials, or toroidal cores are possible. It is to be understood that the invention is not limited to any specific geometries of the cores or to any specific materials therefor; and that the examples given are illustrative only.

In the following description a bar type core has been utilized for ease of representation and for facility in showing winding directions. Further, the following description has adopted materials having hysteresis loops substantially the same as that shown in Figure 1, for ease of discussion. Neither of these requirements, however, is mandatory and many variations in both material and core configuration will readily suggest themselves to those skilled in the art.

The core 20 carries a coil 21 mounted thereon. One end of the said coil is coupled to an input source 22, preferably of relatively low impedance or, in general, one capable of accepting a reverse current at its output terminals; and the other end of the said coil 21 is connected to a parallel combination of capacitor C and resistor $R_L$, as shown.

Referring now to Figures 8C and 8D, if it be assumed that the core is initially at point 10 (plus $B_r$), as shown in Figure 1, a positive-going input pulse at terminal 22 will tend to drive the core from point 10 to point 11 (plus saturation). During this operation, the coil 21 presents a relatively low impedance and the current flow caused by the input pulse passes through the said coil to capacitor C and resistor $R_L$, thereby charging the capacitor C. As may be seen from Figure 8C, one such input pulse occurs during the times $t4$ to $t5$. During the charging of capacitor C an output may be obtained at point 23 across load resistor $R_L$. If desired, however, a circuit may be interposed in line 24 which will block current flow to the output terminal until the capacitor C discharges. Such a blocking feature is in fact present in the circuit of Figure 7, and the functioning thereof will become apparent later in the present description of my inveniton. During the time $t5$ through $t6$, the input pulse is no longer present at terminal 22 and capacitor C tends to discharge through parallel paths (*a*) $R_L$ to ground (thereby giving an output across $R_L$ during the time $t5$–$t6$); and (b) back through coil 21 to the terminal of input source 22. The reverse current flow through coil 21 to the low impedance input source 22 upon discharge of capacitor C causes the coil to flip from point 10 back through minus $H_c$ to point 14. At the end of time $t6$ (the discharge of capacitor C being effectively completed through the period $t5$ to $t6$), the core moves to operating point 13 (minus $B_r$) and a second input pulse of the same polarity (plus H) applied to terminal 22 will cause the core to be driven from point 13 ($-B_r$) through point plus $H_c$ to point 12. This particular operation presents the input pulse with a relatively high impedance so that very little of the energy is actually passed down through coil 21 to capacitor C, the major portion of the energy being utilized in the flipping of the core back to plus $B_r$, point 10. As a result of this, the capacitor C receives very little charge during the period $t6$ to $t7$, and the charge actually present on the capacitor C is not sufficient to flip the core back to minus $B_r$ during the period $t7$ to $t8$. Thus, at time $t10$ the core is once more back at point 10 (plus $B_r$), and a third positive-going input pulse at terminals 22 during $t10$–$t11$ will again find a relatively low impedance presented by the coil 21 whereupon capacitor C is once more heavily charged and a major output is again obtained upon discharge thereof as was described in reference to times $t5$ to $t6$. As may be seen from the foregoing, because of the alternate charge and discharge of capacitor C, the coil is selectively flipped between plus $B_r$ and minus $B_r$, and two successive input pulses produce but a single output pulse. Thus the schematic of Figure 2 depicts a most simple form of binary counter.

As was mentioned previously, the wave shapes for the charge and discharge of capacitor C are relatively complex. Further, because of the exponential character of the capacitor discharge, the actual current flows are not confined strictly to the time divisions previously described. Accordingly, I find that substantially better characteristics may be achieved by the circuitry shown in Figure 3, wherein a pulse forming network 30, of which a Guillemin line is an example, is substituted for the capacitor C. The operation of such networks or lines are well known in the art and are characterized by the fact that the line once charged discharges in a substantially square wave configuration, thereby reducing the total discharge time from that present in the case of a capacitor, and further providing for more efficient utilization of the energy stored. The operation of the circuit shown in Figure 3 is substantially the same as that of Figure 2. Once more assuming the core to be initially at plus $B_r$, and again referring to Figures 8C and D, a first positive input pulse at point 31 finds the coil 32 to present a relatively low impedance whereby a major portion of the energy present in the said input pulse passes through coil 32 to thereby charge pulse forming network 30. When the input pulse at terminal 31 ceases, pulse-forming network 30 discharges in a substantially square wave configuration, passing a pulse of current in the reverse direction back through coil 32 to input source 31, thereby flipping core 33 from point 10 (plus $B_r$) to point 13 (minus $B_r$) and giving a usable output. A second positive-going input pulse applied to input terminal 31 (subsequent to the "flip") will suffice merely to once more flip the core to point 12, and thence to point 10 of the hysteresis loop. Because of the high impedance characteristic present during this operating state, the said second positive-going input pulse will not produce a substantial output pulse. Thus the circuits shown in Figures 2 and 3 provide, through the use of but a single core, a winding on the said core, and a storage network coupled to one end of the said core, a simple and efficient basic binary counter.

This type of binary counter is utilized in the counter chain shown in Figures 6 and 7.

As will be appreciated from the foregoing discussion, the binary counters of Figures 2 and 3 do not effect any power gain but merely provide a single output pulse for two successive input pulses. It is accordingly desirable, although not mandatory, to separate successive binary counters in the counter chain by amplifier stages, and in one embodiment of my invention such amplifiers may take the form of non-complementing series amplifiers. Referring now to Figure 4, one such amplifier has been shown. This amplifier comprises a core 40 exhibiting a hysteresis loop substantially the same as that shown in Figure 1, the said core carrying a first coil 41 thereon as well as a second coil 42. Coil 41 is coupled at one of its ends to the cathode of a diode $D_1$. The plate of the said diode $D_1$ is, in turn, connected to a terminal 43 which is connected to a source of positive and negative going power pulses such as are shown in Figure 5A. The cathode of diode $D_1$ is further connected through a resistor $R_1$ to a source of negative potential ($-V$). The other end of coil 41 is connected to a load resistor $R_L$ across which resistor the output of the amplifier may be taken. A resistor $R_2$ is connected between said other end of coil 41 and said source of negative potential ($-V$), and a diode $D_3$, poled as shown, is also connected between said other end of coil 41 and ground. Coil 42 is connected at one of its ends to a source of positive voltage ($+E$) and at its other end through a diode $D_2$ to a signal input source 44.

Referring now to Figures 1, 4, and 5, the operation of this particular configuration will readily become apparent. Assuming that no signal is applied at input 44, and further assuming that the core 40 is initially at point 13 (minus $B_r$) at the beginning of the operation to be discussed, it will be seen that during the time $t1$ to $t2$ the positive-going power pulse, P, will cause the core to travel from point 13 (minus $B_r$) to point 10 (plus $B_r$), as was discussed in the case of the binary counters above described. This flipping from minus $B_r$ to plus $B_r$ does not effect a substantial output inasmuch as winding 41 presents a high impedance during this time. However, some current does flow and a minor output would, in the absence of suppression circuitry, appear across resistor $R_L$, this minor output being shown in dotted lines between times $t1$ and $t2$ at Figure 5C. Such an output is termed a "sneak" output and is in fact suppressed by diode $D_3$ and resistor $R_2$ in the manner to be described subsequently. During the negative half, Q, of the power pulse, occurring during times $t2$ to $t3$, the diode $D_1$ is cut off and as a result there is a reverse current flow from ground through diode $D_3$, thence through coil 41 and resistor $R_1$ to the negative potential $-V$. Because of this reverse current flow through the output winding 41, the core is again flipped from point 10 (plus $B_r$) counterclockwise around the hysteresis loop to point 13 (minus $B_r$). The next positive-going power pulse (occurring during times $t3$ through $t4$) now again appears at terminal 43 and once more finds the coil 41 to present a high impedance; the energy of the said further positive-going power pulse is thus expended once more in merely flipping the core to plus $B_r$ again giving only a sneak output. Thus, without an input pulse at terminal 44, the core 40 remains in a high impedance state and there is no appreciable output across resistor $R_L$. As will be appreciated, during the flipping of the core due to the above-described operations, a voltage would normally be induced in winding 42. To protect the input circuit coupled to terminal 44 against any interference from current flowing in the said winding 42, the signal winding 42 is returned to a positive voltage $+E$ which is equal and opposite in value to the voltage induced in it by current flowing in winding 41 when the core is being flipped from $+B_r$ through $-H_c$ to $-B_r$. As a result of this, diode $D_2$ is normally cut off and no induced voltage is passed back to the input source 44 during the said flipping.

If a signal should now be applied to the input terminal 44 during the negative half, Q, of the power pulse at terminal 43 (see Figure 5B), the resultant flow of current in signal winding 42 will cancel the effect of the reverse current flow in coil 41 which would otherwise drive the core from plus $B_r$ to minus $B_s$ as was described above. Because of this application of the input signal, therefore, the core remains at point 10 (plus $B_r$), and the next positive-going power pulse (occurring during time $t5$ to $t6$) will then carry the core to plus $B_s$ (point 11 of Figure 1), thereby producing a substantial output across resistor $R_L$. The amount of current needed in signal winding 42 to cancel the effect of the reverse current in winding 41 is determined by the operating effect of resistor $R_1$ which may be chosen to limit the reverse current through the output winding just to the amount necessary to set the core to minus $B_r$. In this situation the signal source need merely supply this amount of current to keep the core at plus $B_r$, provided that there is a unity turns ratio between the two windings 41 and 42. The said turns ratio will not be unity in general, and when it is not, the required input current is multiplied by the ratio of turns on winding 41 to the turns on winding 42.

As was discussed previously, in the absence of an input signal at terminal 44, while a major output is not obtained, there is a sneak output as shown in dotted lines at Figure 5C. This sneak output is effectively suppressed by the arrangement of diode $D_3$ and resistor $R_2$. This suppression is effective as follows. The sneak suppressor $R_2$–$D_3$ normally passes a current from ground through diode $D_3$ and thence through resistor $R_2$ to the source $-V$, which current is equal to or greater than the sneak pulse current otherwise present. When the output from the amplifier is merely a sneak output, the sneak current is effectively cancelled by the current flowing through resistor $R_2$ and diode $D_3$. The output voltage thus remains at approximately zero. However, when a desired output pulse is present, this output pulse effectively overcomes the suppression current flowing through resistor $R_2$ and diode $D_3$ thereby providing the desired output. Thus, the circuit of Figure 4 acts as a true amplifier, and gives a usable output pulse during the positive going power pulse occurring immediately after an input pulse is presented to terminal 44. It should be noted that inasmuch as an output does appear for every input, and does not occur when there is no input, the amplifier is termed "non-complementing." Further, inasmuch as the output is in series with power winding 41, the amplifier is of the "series" type. Reference is made to the copending applications of Theodore H. Bonn and Robert D. Torrey, Serial No. 402,858, filed January 8, 1954, for: "Signal Translating Device"; and to copending application of John Presper Eckert, Jr., and Theodore H. Bonn, Serial No. 382,180, filed September 24, 1953, for: "Signal Translating Device." Each of these copending applications describes other types of amplifiers, termed "non-complementing" and "complementing" as well as amplifiers termed "series" and "parallel," which may be employed in the practice of the present invention.

Reference is now made to Figure 6 which depicts in logical form a chain counter utilizing the circuits of Figures 4 and of 2 or 3, to effect the counting of large numbers. As will become apparent from the following discussion, the storage of energy in the several binary counter stages not only permits actual operation of the counters (as has already been discussed) but also makes it possible to use but a single source of power for energizing the several magnetic components of the counter shown in Figures 6 and 7. If a series of input pulses are presented at input terminal 60 of Figure 6, binary counter 61 will, in accordance with the preceding description, give a single output pulse for each pair of input pulses. The output of binary counter 61 is fed to non-complementing amplifier 62 for power gain, there being an output from amplifier 62 for each input pulse thereto. The output of amplifier 62 is in turn fed to a further binary counter stage 63, again of the type described previously; and this further binary counter stage again gives but a single output pulse for each pair of pulses at the input thereof. Further amplifiers 64 and 65, and binary counters such as 66, may be added to the chain to effect the counting of as large numbers as are desired. The number of stages actually required will depend upon the magnitude of number to be counted, as is well known to those skilled in the art.

Figure 7 shows in schematic form two stages of the counter of Figure 6. These two stages comprise a non-complementing amplifier 80 and binary counter 81 coupled to a further non-complementing amplifier 82 and binary counter 83. Non-complementing amplifiers 80 and 82 are each of the same configuration as that shown in Figure 4 and their operation is as previously described. Again, binary counters 81 and 83 are substantially the same as those shown in either Figure 2 or Figure 3. For purposes of simplification, binary counters 81 and 83 have been provided with a simple capacitor $C_s$ only. It is to be understood, however, that the Guillemin line or other pulse-forming network, such as are discussed in reference to Figure 3, may preferably be substituted for the capacitor $C_s$. The device of Figure 7 operates in the manner discussed previously, and this operation may be seen by referring to the wave diagrams shown at Figure 8.

Referring to Figure 8A, it will be seen that a power pulse train is applied to non-complementing amplifier 80 through terminal 70, the positive-going portions of the said power pulse occurring during times *t*2 to *t*3, *t*4 to *t*5, *t*6 to *t*7, etc. Let us now assume that an input signal of the form shown in Figure 8B is coupled to point 72 of non-complementing amplifier 80. Whenever there is an input signal in the time period immediately preceding the positive-going power pulse of non-complementing amplifier 80, non-complementing amplifier 80 will give an output pulse, as shown in Figure 8C, coincident with the positive-going power pulse present at terminal 70. These output pulses, which are shown in Figure 8C, are then fed to the input of binary counter 81 which operates in the manner described in reference to Figures 2 and 3, giving an output for each pair of input pulses thereto, as shown in Figure 8D. The output of binary counter 81, in turn, serves as the input to non-complementing amplifier 82. As will be discussed subsequently, the output is taken from capacitor $C_s$ (or from the pulse-forming line substituted therefor) upon discharge, rather than charge, of the capacitor (or pulse forming line). As a result of this, the effective outputs from binary counter 81 occurs during times *t*5 to *t*6, *t*11 to *t*12, *t*15 to *t*16, each of which times coincides with the application of a negative going power pulse to non-complementing amplifier 82. Therefore, the output of binary counter 81 performs, for non-complementing amplifier 82, precisely the same function as did the input signal pulses to amplifier 80. The output of non-complementing amplifier 82, Figure 8E, again comprises a pulse for each pulse at the input thereof, and these output pulses are in turn fed to the further binary counter 83 to give at point F the output pulses shown in Figure 8F. The next amplifier stage (not shown) will operate, in the same way as was previously discussed, from the output of binary counter 83 provided the said further amplifier is also fed with power pulses of the same phase as was utilized in the other amplifiers. The power pulses applied to the several amplifiers in the chain are thus of identical phase and may be supplied from a single power pulse source. This arises inasmuch as the output is taken from capacitors $C_s$ only during discharge.

Figure 8:
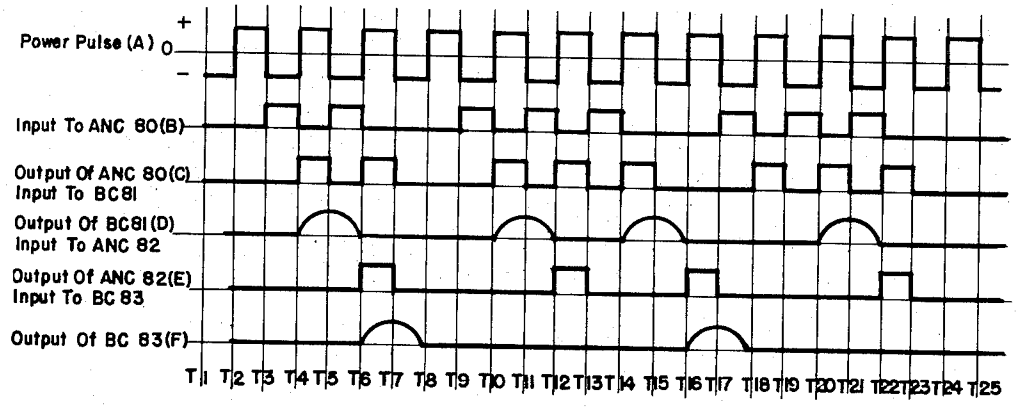
Figures 8 (A through F, inclusive) represent wave form diagrams depicting the operation of the circuit shown in Figure 7.

If the output were taken during charging of the said capacitors, however, an examination of Figure 8 will show that the power pulses supplied to successive amplifiers would have to alternate in phase.

As shown in Figure 8B, the pulse inputs to non-complementing amplifier 82 may be selectively applied and the several pulses need not follow any precise or predetermined cycle of application. In addition, in illustrating and describing the operation of the circuit of Figure 7 by the wave forms of Figure 8, it was assumed that the windings on the cores of binary counters 81 and 83 were initially both in the low impedance condition. This is actually but one of four possible combinations, and an extension of the above discussion will show that, for the several possible initial impedance conditions of the binary counters, outputs will occur at the following times for the same inputs shown in Figure 8B:

| | Initial Impedance of Binary Counter 81 | Initial Impedance of Binary Counter 83 | Output Times of Curve D | Output Times of Curve F |
|---|---|---|---|---|
| 1 | Low | Low | *t*4-t6; *t*10-*t*12 *t*14-t16; *t*20-t22 | *t*6-*t*8; *t*16-*t*18 |
| 2 | Low | High | *t*4-t6; *t*10-*t*12 *t*14-*t*16; *t*20-*t*22 | *t*12-t14; *t*22-*t*24 |
| 3 | High | Low | *t*6-*t*8; *t*12-*t*14 *t*18-*t*20; *t*22-*t*24 | *t*8-t10; *t*20-t22 |
| 4 | High | High | *t*6-*t*8; *t*12-*t*14 *t*18-*t*20; *t*22-*t*24 | *t*14-*t*16; *t*24-*t*26 |

Let us now examine how the output is taken on discharge rather than on charge of capacitors $C_s$. As will be seen from Figure 7, when each of the capacitors $C_s$ are charged, the charging current flows through the corresponding binary counter coil. No output is coupled through the buffer, such as X, to the next amplifier stage during the charging of a capacitor $C_s$, however, because of the combination of the source +E and the voltage induced in the signal winding of the said next amplifier stage, such as Y, by the power pulse of the said next amplifier stage. Thus, during the charging of condenser $C_s$ of the preceding binary counter stage, the input point (72, 73, 74. etc.) of each signal winding for each of the magnetic amplifiers is either at +E (due to the relatively small flux change through the signal coil when the amplifier is to give an output), or at +2E (due to the relatively large flux charge through the signal coil when the amplifier is not to give an output). Each of the capacitors $C_s$ in discharging, however, passes current back through the winding of its respective binary counter as well as through the properly poled buffer diode X to the next following amplifier stage, thus flipping the counter core and giving an input to the next succeeding magnetic amplifier. As a result, there are in effect two discharge paths for each of the capacitors $C_s$ but only a single charge path. It should also be noted that because of the sneak suppressor in each of the non-complementing amplifier stages, sneak current cannot flow to the next succeeding binary counter stage and will not, as a result, flip that core to thus render its operation unreliable.

As may be seen from the foregoing, I have provided a counter chain capable of counting large numbers through the use of very simple magnetic amplifiers and magnetic binary counter stages. The structure as a whole is extremely rugged and is not subject to operational failure under normal operating circumstances. While I have discussed but one embodiment of my invention, I have also mentioned numerous variations which could be made in the practice of said embodiment. Other variations will likewise suggest themselves to those skilled in the art, and each of these is meant to fall within the scope of the present disclosure.

Having thus described my invention, I claim:

1. A binary counter comprising a pulse type magnetic amplifier having an input winding circuit and an output winding circuit, a core of magnetic material exhibiting a substantially rectangular hysteresis loop, a coil wound on said core, energy storage means coupled to one end of said coil, the other end of said coil being connected to said amplifier output winding circuit, means for energizing said amplifier output winding circuit with spaced power pulses, means for selectively applying input pulses to the amplifier input circuit in the spaces between said power pulses whereby the application of an input pulse to the amplifier subsequently effects a power pulse to said coil, and low impedance means connected in the output winding circuit of said amplifier to absorb sneak currents therein, said energy storage means being connected alternately to store pulses passing through said coil from said amplifier in response to said selective input pulses and discharging pulses through said coil to said low impedance means between successive input pulses, thereby to alternate the operating point of said core on said hysteresis loop, said low impedance means including a diode, a resistor and a potential source, said diode connecting said output circuit to a point of reference potential and said resistor connecting said output circuit to said potential source, said low impedance means being connected to absorb said sneak currents occurring in said output circuit as well as pulses discharged from said energy storage means.

2. A binary counter comprising a plurality of magnetic amplifiers provided with input circuits and output circuits, a plurality of magnetic binary counters respectively interposed therebetween thereby to effect a counter chain, means for energizing said amplifiers with spaced power pulses, said amplifiers being energized in phase with one another, each of said binary counters comprising a core of magnetic material exhibiting a substantially rectangular hysteresis loop having a coil thereon, means coupling the output circuit of each amplifier to one end of the aforesaid coil comprising a next subsequent binary counter, energy storage means coupled to the other end of each of said coils respectively whereby a pulse passing through each said coil charges the storage means coupled to said coil and said storage means discharges upon termination of said pulse, low impedance means in each output circuit comprising a low-impedance diode clamp circuit whereby a portion at least of the discharge from said storage means passes through said coil as a return flow thereby to alternate the operating point of said core on said hysteresis loop, rectifier means coupling each of said storage means to the input circuit of the next subsequent magnetic amplifier in said chain, and means for rendering each of said rectifier means non-conductive except during limited time periods corresponding to the spaces between power pulses comprising a source of blocking pulses coupled to said input circuit whereby each of said amplifiers derives an input from a preceding storage means only during discharge of said preceding storage means.

3. A binary counter comprising a core of magnetic material exhibiting a substantially rectangular hysteresis loop, a coil wound on said core, energy storage means coupled to one end of said coil, a low impedance source of input pulses coupled to the other end of said coil, said energy storage means alternately storing input pulses passing from said source through said coil and discharging pulses through said coil to said source between successive ones of said input pulses thereby to alternate the operating point of said core on said hysteresis loop, a pulse type magnetic amplifier having an input winding and an output winding, rectifier means coupling said storage means to said input winding, said input winding being responsive to pulses discharged by said storage means to condition said amplifier to produce an output, and control means in said magnetic amplifier effective to limit the time periods during which pulses can be passed from said storage means to said input winding, wherein said control means includes said rectifier means and means for inducing a blocking potential in said input winding effective to cut off said rectifier means during first time intervals, said first time intervals coinciding with the application of input pulses to said energy storage means.

4. The counter of claim 3 in which said energy storage means comprises a pulse forming network operative to discharge a substantially squarewave pulse.

5. The counter of claim 3 said control means further including a potential source coupled to said rectifier means.

6. The counter of claim 3 in which said amplifier includes a second core exhibiting a substantially rectangular hysteresis loop, one end of said output winding being connected to a source of spaced power pulses, the pulses discharged by said storage means to condition said amplifier occurring during spaces between said power pulses.

7. The counter of claim 6 wherein the power pulses are alternately positive and negative going, the positive going portions of said power pulses causing a voltage to be induced in said input winding of said amplifier which induced voltage opposes energy flow through said rectifier means so that energy may be fed from said storage means to said input winding of said amplifier during the negative going portions of said power pulses only.

8. The counter of claim 7 in which said magnetic amplifier is non-complementing in operation.

References Cited in the file of this patent

UNITED STATES PATENTS

| | | |
|---|---|---|
| 2,640,164 | Giel | May 26, 1953 |
| 2,678,965 | Ziffer | May 18, 1954 |
| 2,697,178 | Isborn | Dec. 14, 1954 |
| 2,709,798 | Steagall | May 31, 1955 |
| 2,713,675 | Schmitt | July 19, 1955 |
| 2,719,962 | Karnaugh | Oct. 4, 1955 |
| 2,721,947 | Isborn | Oct. 25, 1955 |
| 2,731,203 | Miles | Jan. 17, 1956 |

OTHER REFERENCES

"A Magnetic Scaling Circuit" (Hertz), Journal of Applied Physics, vol. 22, January 1951, pp. 107–108.